(12) United States Patent
Ji et al.

(10) Patent No.: US 11,806,622 B2
(45) Date of Patent: Nov. 7, 2023

(54) INFORMATION DISPLAY METHOD AND APPARATUS, ELECTRONIC DEVICE, AND COMPUTER STORAGE MEDIUM

(71) Applicant: TENCENT TECHNOLOGY (SHENZHEN) COMPANY LIMITED, Guangdong (CN)

(72) Inventors: Guang Hui Ji, Shenzhen (CN); Xiao Lin Li, Shenzhen (CN); Jian Ping Zhan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 184 days.

(21) Appl. No.: 17/325,303

(22) Filed: May 20, 2021

(65) Prior Publication Data
US 2021/0268382 A1    Sep. 2, 2021

Related U.S. Application Data

(63) Continuation of application No. PCT/CN2020/093860, filed on Jun. 2, 2020.

(30) Foreign Application Priority Data

Jun. 5, 2019   (CN) .......................... 201910487795.6

(51) Int. Cl.
*A63F 13/56* (2014.01)
*A63F 13/5375* (2014.01)
(Continued)

(52) U.S. Cl.
CPC .......... *A63F 13/56* (2014.09); *A63F 13/5375* (2014.09); *A63F 13/573* (2014.09); *A63F 13/803* (2014.09)

(58) Field of Classification Search
CPC .... A63F 13/56; A63F 13/5375; A63F 13/573; A63F 13/803
See application file for complete search history.

(56) References Cited

U.S. PATENT DOCUMENTS

2007/0155458 A1*  7/2007  Tipping ................ A63F 13/573
                                                    463/6
2007/0265087 A1* 11/2007  Akahori ............... A63F 13/803
                                                    463/37
(Continued)

FOREIGN PATENT DOCUMENTS

CN        107019915 A      8/2017
CN        108619722 A     10/2018
(Continued)

OTHER PUBLICATIONS

Go-Kart Xiaojie: Have you learned such silky drifting technique video (available online: https://haokan.baidu.com/v?vid=11402785743449430324&pd=bjh&fr=bjhauthor&type=video)(dated Apr. 13, 2019).*
First Office Action of Chinese Application No. 201910487795.6 dated Jan. 6, 2020.
Second Office Action of Chinese Application No. 201910487795.6 dated May 13, 2020.
(Continued)

*Primary Examiner* — James S. McClellan
(74) *Attorney, Agent, or Firm* — Sughrue Mion, PLLC (57) ABSTRACT

Embodiments of the disclosure provide an information display method and apparatus, an electronic device, and a computer storage medium. The method includes: obtaining a motion status of a target object at a current moment in a virtual scene and a first operation for controlling the target object to move in the virtual scene; predicting a first moving track along which the target object is to move within a period of time after the current moment based on the motion status of the target object at the current moment and the first operation; and displaying the first moving track and a second moving track, the second moving track being a moving track
(Continued)

along which the target object has moved before the current moment.

19 Claims, 6 Drawing Sheets

(51) Int. Cl.
*A63F 13/573* (2014.01)
*A63F 13/803* (2014.01)

(56) References Cited

U.S. PATENT DOCUMENTS

| 2013/0066586 A1* | 3/2013 | Miyamoto | A63F 13/422 |
| | | | 702/141 |
| 2019/0336863 A1* | 11/2019 | Hayashi | A63F 13/69 |

FOREIGN PATENT DOCUMENTS

| CN | 108654087 A | 10/2018 |
| CN | 109513210 A | 3/2019 |
| CN | 110170169 A | 8/2019 |
| JP | 2000-342846 A | 12/2000 |

OTHER PUBLICATIONS

Third Office Action of Chinese Application No. 201910487795.6 dated Jun. 16, 2020.
International Search Report of PCT/CN2020/093860 dated Aug. 26, 2020 [PCT/ISA/210].
Written Opinion of PCT/CN2020/093860 dated Aug. 26, 2020 [PCT/ISA/210].
Office Action dated Sep. 6, 2022 in Japanese Application No. 2021-543180.
English Translation of Written Opinion of the International Searching Authority dated Aug. 26, 2020 in International Application No. PCT/CN2020/093860.
Feng She Qu, "CrazyRacing KartRider Mobile Domestic Internal Testing: Introducing Racing Helmets for Beginners Presented by Hu Ya Lun Hui", bilibili Network, Mar. 13, 2019; Video Starting from 0:58 to 2:44, Retrieved from: URL: <https://www.bilibili.com/video/av46167179?>.
Office Action dated Jan. 6, 2020 in Chinese Application No. 201910487795.6.
Lu Ren Xiao Jie, "Xiao Jie from Crazyracing KartRider: Tips and Tricks You Need to Know to Drift Smoothly", Baidu, Apr. 13, 2019, Video Starting from 0:15 to 2:45, Retrieved from: URL: <https://haokan.baidu.com/v?vid=11402785743449430324&pd=bjh&fr=bjhauthor&type=video>.

* cited by examiner

INFORMATION DISPLAY METHOD AND APPARATUS, ELECTRONIC DEVICE, AND COMPUTER STORAGE MEDIUM

CROSS-REFERENCE TO RELATED APPLICATION(S)

This application is a bypass continuation application of International Application No. PCT/CN2020/093860, filed Jun. 2, 2020, which claims priority to Chinese Patent Application No. 201910487795.6, filed with the China National Intellectual Property Administration on Jun. 5, 2019, the disclosures of which are herein incorporated by reference in their entireties.

FIELD

The disclosure relates to the Internet field, and in particular, to an information display method and apparatus, an electronic device, and a computer storage medium.

BACKGROUND

With the development of computer technologies and graphics and image technologies, video games emerge. The video game refers to a game using a device (or referred to as a game terminal) fitted with electronic components as a running platform. Different from conventional games, which need physical game items such as chess pieces and playing cards, the video game is a game mode of interacting by controlling game terminals.

In the Internet age, video games have developed into online games. Playing online games has become one of the most popular ways of leisure and entertainment. The online games have a powerful interpersonal communication platform, and users obtain plenty of virtual reality experience in games, which was not available in the conventional games. A player (or referred to as a game user) may play a virtual role in a game interface of a game terminal, to play with other virtual roles in the game.

However, in the related art online racing games, only a track that a player has already traveled is displayed in a vehicle driving process of the player. As a result, less information is displayed and user experience is deteriorated.

SUMMARY

Embodiments of the disclosure provide an information display method and apparatus, an electronic device, and a computer storage medium, which may display both a track that a vehicle has traveled and a predicted traveling track of the vehicle in a future period of time, so that more relevant information is displayed in a virtual scene.

According to an aspect of an example embodiment, provided is an information display method, performed by a terminal, the method including:

obtaining a motion status of a target object at a current moment in a virtual scene and a first operation for controlling the target object to move in the virtual scene;

predicting a first moving track along which the target object is to move within a period of time after the current moment based on the motion status of the target object at the current moment and the first operation; and displaying the first moving track and a second moving track, the second moving track being a moving track along which the target object has moved before the current moment.

According to an aspect of an example embodiment, provided is an information display apparatus, including:

at least one memory configured to store program code; and at least one processor configured to read the program code and operate as instructed by the program code, the program code comprising:

obtaining code configured to cause the at least one processor to obtain a motion status of a target object at a current moment in a virtual scene and a first operation for controlling the target object to move in the virtual scene;

determining code configured to cause the at least one processor to predict a first moving track along which the target object is to move within a period of time after the current moment based on the motion status of the target object at the current moment and the first operation, display code configured to cause the at least one processor to display the first moving track and a second moving track, the second moving track being a moving track along which the target object has moved before the current moment.

According to an aspect of an example embodiment, provided is an information display method, performed by a terminal, the terminal including one or more processors, a memory, and one or more programs, the one or more programs being stored in the memory, the program including one or more units, each unit corresponding to a set of instructions, and the one or more processors being configured to execute an instruction; and the method including:

obtaining a motion status of a target object at a current moment in a virtual scene and a first operation for controlling the target object to move in the virtual scene;

predicting a first moving track along which the target object is to move within a period of time after the current moment based on the motion status of the target object at the current moment and the first operation; and displaying the first moving track and a second moving track, the second moving track being a moving track along which the target object has moved before the current moment.

According to an aspect of an example embodiment, provided is a computer storage medium storing a computer program, the computer program being configured to perform the information display method provided in the embodiments of the disclosure.

According to an aspect of an example embodiment, provided is an electronic device, including a memory and a processor, the memory being configured to store a computer program; and the processor being configured to perform the information display method provided in the embodiments of the disclosure when running the computer program in the memory.

BRIEF DESCRIPTION OF THE DRAWINGS

Accompanying drawings described herein are used to provide understanding about example embodiments of the disclosure and form a part of the disclosure. Descriptions provided with reference to the drawings are used to explain the example embodiments of the disclosure, and do not constitute a limit on the embodiments of the disclosure.

DETAILED DESCRIPTION

In order to make persons skilled in the art better understand the technical solutions of the disclosure, the following clearly and completely describes the technical solutions in the embodiments of the disclosure with reference to the accompanying drawings in the embodiments of the disclosure. Apparently, the described embodiments are only some of the embodiments of the disclosure rather than all of the embodiments. All other embodiments that may be obtained by a person of ordinary skill in the art based on the embodiments of the disclosure described herein without creative efforts shall fall within the protection scope of the disclosure.

In this specification, claims, and accompanying drawings of the disclosure, the terms "first", "second", and so on are intended to distinguish similar objects but do not necessarily indicate a specific order or sequence. It is to be understood that such used data is interchangeable where appropriate so that the embodiments of the disclosure described here may be implemented in an order other than those illustrated or described here. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
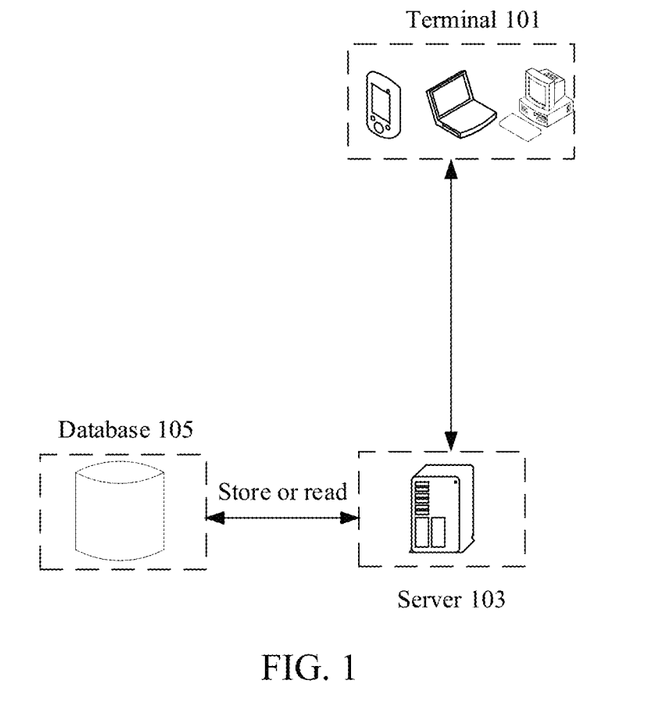
FIG. 1 is a schematic diagram of a hardware environment of an information display method according to an example embodiment of the disclosure.

FIG. 1 is a schematic diagram of a hardware environment of an information display method according to an embodiment of the disclosure. Referring to FIG. 1, in some embodiments, the information display method provided in an example embodiment of the disclosure is applicable to the hardware environment including a terminal 101 and a server 103 shown in FIG. 1. As shown in FIG. 1, the server 103 is connected to the terminal 101 through a network, and may provide a service (such as a game service or an application service) for the terminal or a client installed on the terminal. A database 105 may be set up on the server or an independent database 105 may be set up independently of the server 103, and the database 105 provides a data storage service for the server 103. The network includes, but is not limited to, a wide area network, a metropolitan area network, or a local area network. The terminal 101 includes, but is not limited to, a PC, a mobile phone, a tablet computer, and the like.

The information display method in an example embodiment of the disclosure may be performed by the terminal 101, or may be performed by the terminal 101 and the server 103 in cooperation. In some embodiments, the terminal 101 has a client installed thereon and performs the information display method in an example embodiment of the disclosure by using the client.

In some embodiments, the information display method provided in an example embodiment of the disclosure includes the following operations.

S1. A terminal obtains a motion status of a target object at a current moment in a virtual scene and a first operation for controlling the target object to move in the virtual scene.

During an actual implementation, the target object may be any object in the virtual scene, for example, a vehicle object, an animal object, and a cartoon character object. The target object may be in a moving state (that is, being in movement).

The first operation is used for controlling the target object to move in the virtual scene, for example, controlling the target object to go forward, go backward, turn around, and speed up along a target route in the virtual scene.

S2. Predict a first moving track of the target object within a period of time after the current moment with reference to the motion status of the target object at the current moment and the first operation.

The first moving track includes a moving route of the target object within a period of time after the current moment.

S3. Display the first moving track and a second moving track.

In some embodiments, the second moving track is a moving track of the target object before the current moment, and a position at which the first moving track meets the second moving track is a position of the target object at the current moment.

Figure 2:
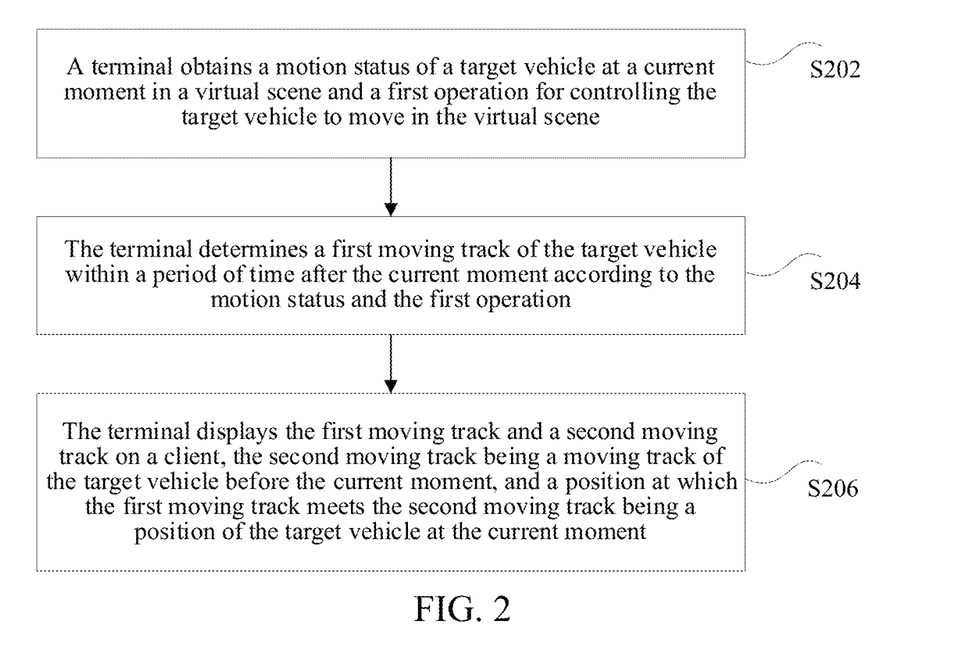
FIG. 2 is a flowchart of an information display method according to an example embodiment of the disclosure.

Next, the information display method provided in an example embodiment of the disclosure is described by using an example in which the target object is a target vehicle in the virtual scene. FIG. 2 is a flowchart of an information display method according to an example embodiment of the disclosure. As shown in FIG. 2, the method may include the following operations S202, S204, S206.

Operation S202. A terminal obtains a motion status of a target vehicle at a current moment in a virtual scene and a first operation for controlling the target vehicle to move in the virtual scene.

The virtual scene may be displayed in a client, and is a scene that is outputted by using a device and that is different from the real world. Visual perception of the virtual scene may be formed with the aid of naked eyes or devices, for example, by using two-dimensional images outputted by using a display screen or three-dimensional images outputted by using a three-dimensional display technology such as a three-dimensional projection, virtual reality, or augmented reality technology. In addition, a variety of perception simulating the real world such as auditory perception, tactile perception, olfactory perception, and motion perception may be further formed by using a variety of possible hardware. During an actual application, the virtual scene may be a game scene.

The first operation is an operation that is detected on the client at the current moment and used for controlling the target vehicle to move in the virtual scene.

The client is a client provided after a target application is installed on the terminal. The virtual scene is a social or game virtual scene or the like provided by the target application (such as a social application or a game application).

The client provides an interface for a user to interact with a vehicle in the virtual scene, so that the user controls the vehicle. For example, control buttons are displayed on the client, and the user may control the vehicle by manipulating (e.g., tapping/clicking) these control buttons (such as buttons for controlling the first operation detected on the client at the current moment and a second operation at a time later than the current moment).

The motion status may include at least one of a moving velocity, a moving direction, and an external force to the target vehicle. The first operation is a user operation, for example, an acceleration operation or a deceleration operation.

Operation S204. The terminal determines a first moving track of the target vehicle within a period of time after the current moment according to the motion status and the first operation.

The terminal predicts the first moving track of the target vehicle after the current moment according to the motion status and the first operation. That is, the terminal estimates a moving track of the target vehicle in a future period of time (for example, 10 seconds) according to the motion status and the first operation. The moving track may include a moving route and a moving direction.

Operation S206. The terminal displays the first moving track and a second moving track on the client, the second moving track being a moving track of the target vehicle before the current moment, and a position at which the first moving track meets the second moving track being a position of the target vehicle at the current moment.

Through the foregoing operation S202 to operation S206, the first moving track may be displayed at the same time as the second moving track. That is, a predicted traveling track of the vehicle in a future period of time is displayed at the same time as a track that the vehicle has traveled, so that more relevant information is displayed in a virtual scene. In addition, it helps a user to control the target vehicle more accurately and improves user experience.

An example embodiment of the disclosure provides a solution to visually present comprehensive game information and a solution to comprehensively determine a traveling direction according to factors such as power, steering, and inertial resistance, present travel information in a game in real time, and provide feedbacks on inertia and presentation manners during interactive presentation of the game and a scene. The technical solutions of an example embodiment of the disclosure are described below in detail with reference to operation S204 to operation S206.

In the technical solution provided in operation S204, the terminal determines a first moving track of the target vehicle within a period of time after the current moment according to the motion status and the first operation.

In the foregoing embodiment, the determining a first moving track of the target vehicle within a period of time after the current moment according to the motion status and the first operation may be implemented by using the following operation S2042 to operation S2046.

Operation S2042. Determine a first velocity v1 of the target vehicle at a first moment t1 by using a power model.

The power model is configured to describe a relationship between an external force to the target vehicle at a second moment t2, a second velocity v2 of the target vehicle at the second moment t2, traction of the target vehicle at the second moment t2, and the first velocity of the target vehicle at the first moment t1.

The second moment is a moment before the first moment, and the motion status includes the external force to the target vehicle at the second moment and the second velocity of the target vehicle at the second moment.

The traction of the target vehicle at the second moment is determined according to the first operation.

In some embodiments, the determining the first velocity of the target vehicle at the first moment by using the power model includes: when the external force includes friction of the target vehicle at the second moment, determining a first velocity corresponding to the friction of the target vehicle at the first moment, based on the second velocity and the traction of the target vehicle at the second moment by using the power model. That is, when the external force to the target vehicle at the second moment includes the friction of the target vehicle at the second moment, the power model is configured to describe a relationship between the friction, the second velocity, the traction of the target vehicle at the second moment, and the first velocity. Accordingly, the first velocity may be determined by using the relationship between the friction, the second velocity, the traction of the target vehicle at the second moment, and the first velocity. In an example embodiment, a resultant force F of the external force, that includes the friction, and the traction may be calculated, to obtain acceleration $a=F/m$, m being the mass of the target vehicle, and $v1=v2+(t1-t2)\times a$, wherein v1 is the first velocity and v2 is the second velocity.

In some embodiments, the determining the first velocity of the target vehicle by using the power model includes: when the external force includes a rebound force of the target vehicle in a collision at the second moment, determining the first velocity corresponding to the rebound force of the target vehicle at the second moment based on the second velocity and the traction of the target vehicle at the second moment by using the power model. That is, when the external force to the target vehicle at the second moment includes a rebound force of the target vehicle in a collision at the second moment, the power model is configured to describe a relationship between the rebound force, the second velocity, the traction of the target vehicle at the second moment, and the first velocity. Accordingly, the first velocity may be determined by using the relationship between the rebound force, the second velocity, the traction of the target vehicle at the second moment, and the first velocity. In an example embodiment, a resultant force F of the external force, that includes the rebound force and the traction may be calculated, to obtain acceleration $a=F/m$, m being the mass of the target vehicle, and $v1=v2+(t1-t2)\times a$.

A direction of the acceleration a is a direction to which the acceleration is applied at the second moment. Acceleration at the first moment may be calculated by using a similar method (that is, using the resultant force F), and a direction of the calculated acceleration is applied at the first moment. As described in detail below, the direction of the acceleration may be represented with an arrow symbol on a game interface.

Operation S2044. Determine a track point of the target vehicle at the second moment according to the first velocity and the second velocity of the target vehicle.

For example, when a track point at the first moment t1 is known, a distance that the target vehicle travels from the first moment t1 to the second moment t2 may be calculated by using integral or another manner, and then the track point of the target vehicle at the second moment t2 may be determined.

Operation S2046. Fit at least two track points within the period of time to obtain the first moving track.

All track points may be fitted by using a fitting formula, and if the first moving track cannot be completely represented by using a track of a formula, the first moving track may be represented in a form of a plurality of track segments. The process of fitting may be understood as a process of substituting values of known track points into the fitting formula to obtain values of unknown parameters in the fitting formula.

In the technical solution provided in operation S2046, the terminal displays the first moving track and a second moving track on the client, the second moving track being a moving track of the target vehicle before the current moment, and a position at which the first moving track meets the second moving track being a position of the target vehicle at the current moment.

In some embodiments, the first moving track and the second moving track may be displayed in the following manner:

displaying the first moving track in a first display manner and the second moving track in a second display manner on the client. The first display manner is different from the second display manner. The display manners include, but are not limited to, different track colors, different shapes or different colors of track fillers, and different track shapes.

In some embodiments, for the first moving track, a presentation manner is not limited to a special effect of an arrow, and further includes other presentation manners that may present vector information such as a direction and/or a length by using relevant information.

In some embodiments, if there is no obstacle in the estimated moving track (that is, the first moving track) of the target vehicle, the first moving track is a complete track. If there is an obstacle in the estimated moving track of the target vehicle, the first moving track includes a plurality of track segments. In this case, the displaying the first moving track in a first display manner on the client includes: displaying a first track segment and a second track segment in the first display manner on the client. The first moving track includes the first track segment and the second track segment. The first track segment uses the position of the target vehicle at the current moment as a start position, and the first track segment is a moving track generated when the target vehicle moves according to the motion status. The second track segment uses an end position of the first track segment as a start position, and the second track segment is a moving track generated when the target vehicle moves according to the motion status and collides with an obstacle.

In some embodiments, in the process of displaying the first moving track and the second moving track on the client, when a second operation is detected on the client, that is, when there is a new operation of the user, a third moving track and a fourth moving track according to the new operation are displayed on the client. The third moving track is a moving track of the target vehicle after the second operation (or new operation) is detected, and the fourth moving track is a moving track of the target vehicle before the second operation is detected. The third moving track is determined in the same manner as the first moving track, and details are not repeated herein. The second operation is different from the first operation detected on the client at the current moment.

Based on the technical solutions of the disclosure, a result of comprehensive forces to a unit operated by a user and a prompt of interaction with a scene may be presented in an intuitive display form, to prompt the user to avoid subsequent adverse consequences in advance.

The information display method provided in an example embodiment of the disclosure is described below in detail by using an example in which the technical solution of an example embodiment of the disclosure is applied to a game, that is, the virtual scene is a game scene.

Figure 3:
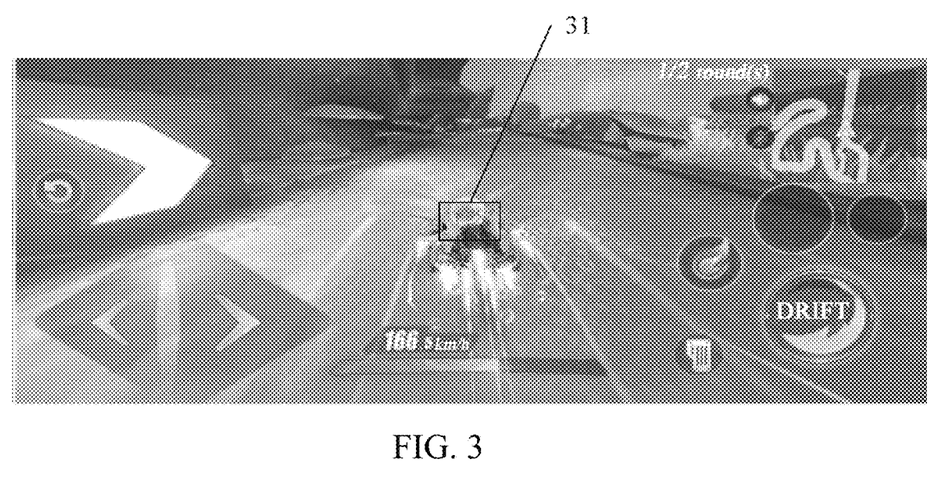
FIG. 3 is a schematic diagram of an example of a game interface.

FIG. 3 is a schematic diagram of an example of a game interface. As shown in FIG. 3, in racing games, for example, games such as QQ Speed, and Together with Speed, route prediction and cognition are implemented by using an orientation of a vehicle head. For example, reference number 31 in FIG. 3 represents a vehicle head part of a vehicle, and a user predicts a heading route by using an orientation of the vehicle head. However, go-kart inertia cannot reflect an actual heading direction of the vehicle by using this method. Because the inertia force is relatively simple, it is more feasible to present a traveling direction by using the orientation of the vehicle head. However, when friction and the like are considered, the orientation of the vehicle head cannot reflect the actual heading direction of the vehicle.

Figure 4:
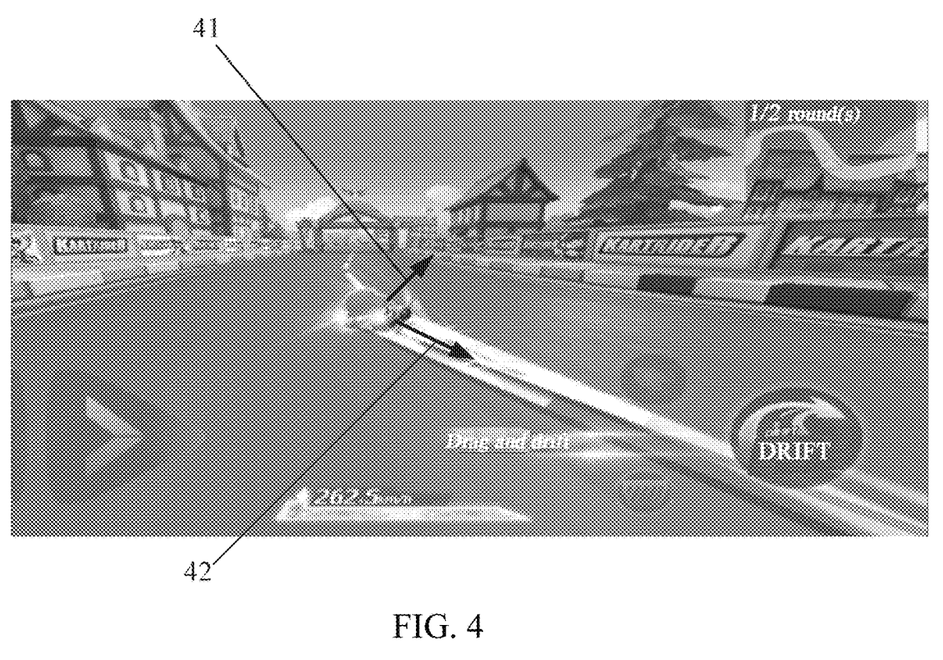
FIG. 4 is a schematic diagram of another example of a game interface.

FIG. 4 is a schematic diagram of another example of a game interface. In a go-kart game shown in FIG. 4, because of the inertia and the friction, a traveling direction of a vehicle cannot be presented intuitively in the foregoing presentation manner in FIG. 3. A direction indicated by an arrow of reference number 41 in FIG. 4 is a current vehicle head direction, but the direction is not the traveling direction of the vehicle. If a heading direction (or traveling direction) is perceived by using a reverse extension line of a wheel, for example, a direction indicated by an arrow of reference number 42 in FIG. 4 is a direction of the reverse extension line of the wheel, the current heading direction of the vehicle may be obtained by using the direction. However, it is relatively difficult for a beginner user to perceive an actual meaning of this presentation manner.

Based on the above problems, the information display method in an example embodiment of the disclosure is provided. A result (including a direction and a size) of comprehensive forces to a unit operated by a user and a prompt of interaction with a scene may be presented in an intuitive display form, to prompt the user to avoid adverse consequences in advance and to perform subsequent operations.

Figure 5:
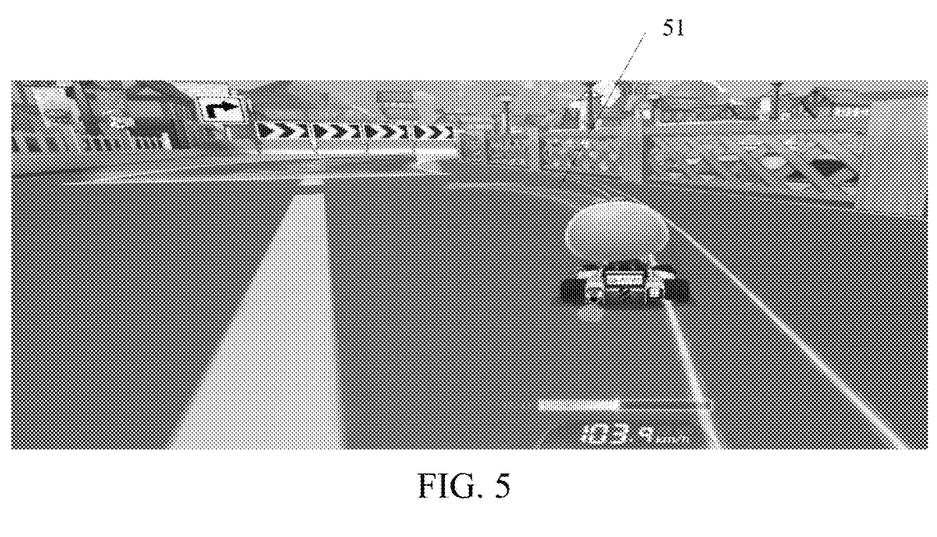
FIG. 5 is a schematic diagram of a game interface according to an example embodiment of the disclosure.
Figure 6:
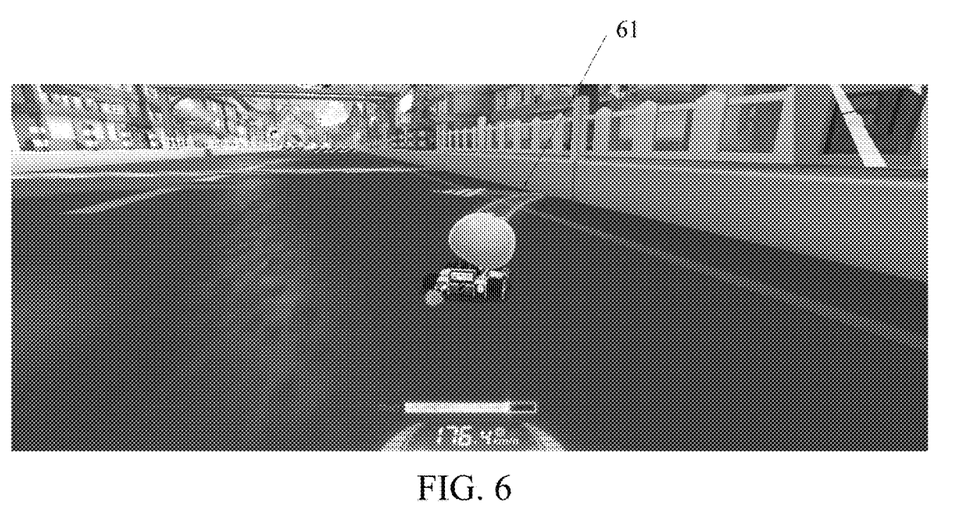
FIG. 6 is a schematic diagram of a game interface according to an example embodiment of the disclosure.

FIGS. 5 and 6 are schematic diagrams of a game interface according to example embodiments of the disclosure. As shown in FIG. 5, an extension line (for example, an arrow that is before a vehicle and that is indicated by reference number 51 in FIG. 5) of the vehicle operated by the user indicates a traveling direction of the vehicle, and along with operations on a power model, the indication line changes in real time to display a subsequent traveling track. As shown in FIG. 6, when a vehicle is going to collide, a predicted track line is also presented according to a rebound route. As shown by reference number 61 in FIG. 6, when the vehicle is going to collide, the predicted track line changes (to the track line indicated by the reference number 61) and is displayed according to the rebound route.

Figure 7:
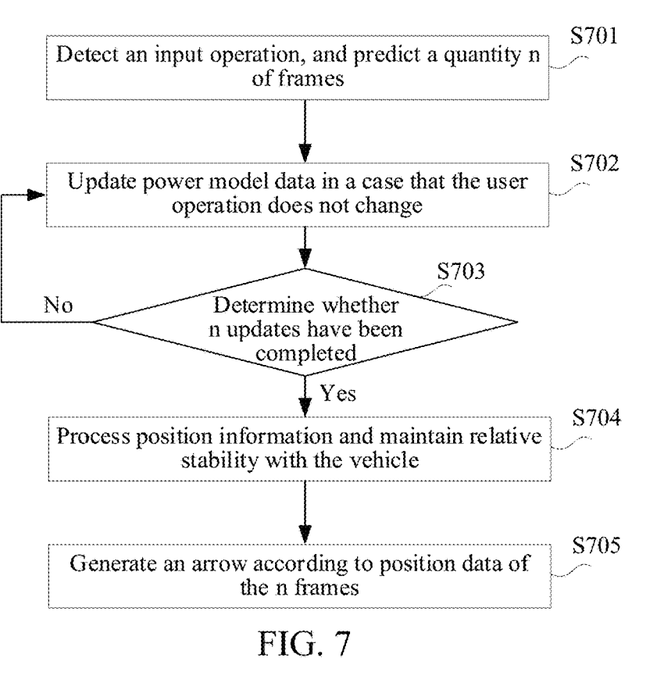
FIG. 7 is a flowchart of an information display method according to an example embodiment of the disclosure.

Based on the technical solution of an example embodiment of the disclosure, a prediction is performed by using a power model of a vehicle in real time according to a current vehicle traveling status and a user operation, and a traveling route of the vehicle within a fixed duration (for example, 1 second) is provided with special effects. FIG. 7 is a flowchart of an information display method according to an example embodiment of the disclosure. An implementation is shown in FIG. 7 and includes the following operations.

Operation S701. Detect an input operation (for example, the first operation), and predict a quantity n of frames.

Operation S702. Update power model data when the user operation does not change.

Operation S703. Determine whether n updates have been completed, and perform operation S704 if the n updates have been completed or perform operation S702 when the n updates have not been completed.

Operation S704. Process position information and maintain relative stability with the vehicle.

Operation S705. Generate visual representation (e.g., an arrow) according to position data of the n frames.

Based on the foregoing embodiment of the disclosure, the power model in the game application monitors the user operation in real time, and updates a predicted route of the track and a special effect mark for presentation when there is any input operation of the user or the vehicle collides during racing.

Figure 8:
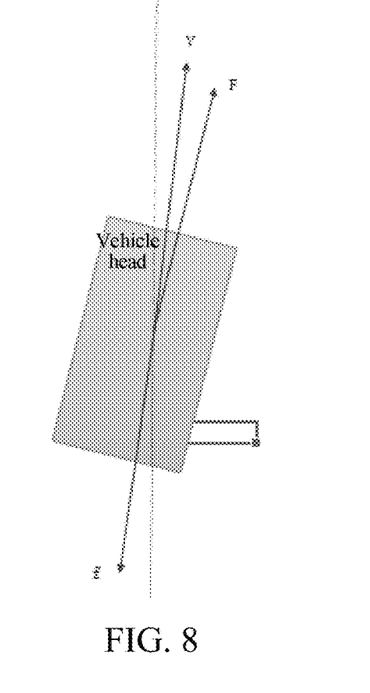
FIG. 8 is a schematic diagram of a vehicle state according to an example embodiment of the disclosure.
Figure 9:
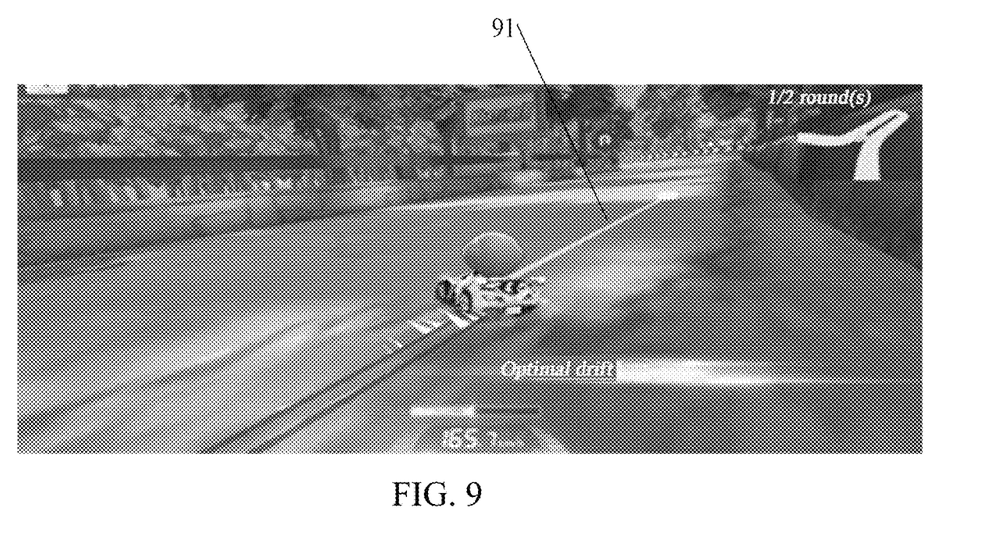
FIG. 9 is a schematic diagram of a game interface.

According to an example embodiment of the disclosure, power, a steering operation, and a drift inertia decay may be calculated to obtain a final result, which is a vector result based on a velocity and a heading direction. FIG. 8 is a schematic diagram of a vehicle state according to an example embodiment of the disclosure. As shown in FIG. 8, f is friction to a vehicle during turning, which is opposite to a heading direction, F is an actual heading direction, and v is vehicle power. F depends on a result of comprehensive calculation based on f and v. FIG. 9 is a schematic diagram of an example of a game interface. As shown by reference number 91 in FIG. 9, a traveling track of a vehicle within a period of time may be determined by using a function of a current force and the period of time. However, the traveling track is not visible to the user in the related art. This may make it difficult for the user to understand inertia of the vehicle.

According to an example embodiment of the disclosure, the vector may be presented in a form of a special effect, and a center-of-gravity position of the unit (e.g., vehicle) operated by the user is connected to an end point position based on the result of the foregoing force (that is, friction and vehicle power) after x time units by using a special effect. Through the length, angle, and radian of the special effect, the user may intuitively feel the predicted position after the x time units. A heading force direction is current acceleration of a traveling route, and an arc-shaped traveling route may be obtained through recursive processing.

Figure 10:
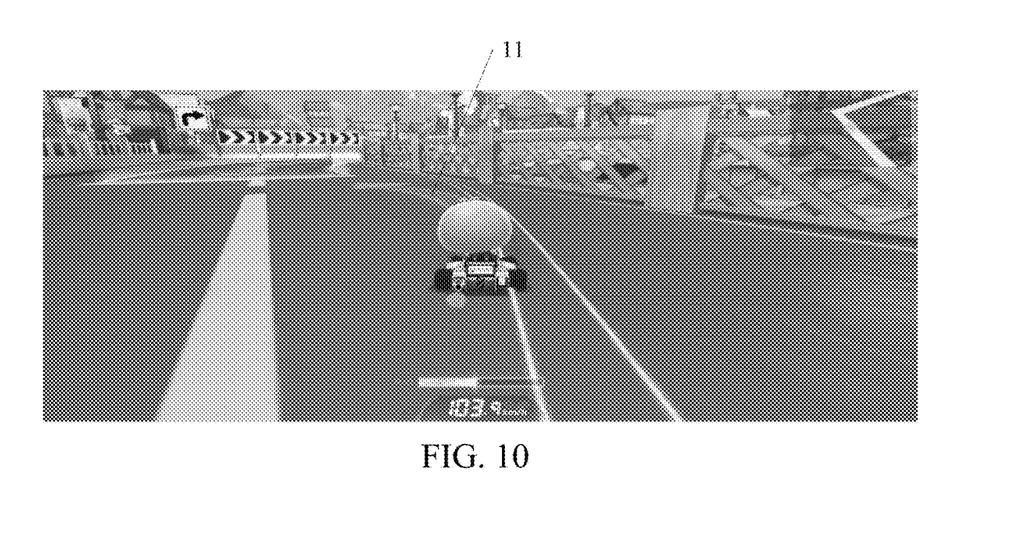
FIG. 10 is a schematic diagram of a game interface according to an example embodiment of the disclosure.

FIG. 10 is a schematic diagram of a game interface according to an example embodiment of the disclosure. As shown in FIG. 10, any operation (for example, the foregoing second operation) of the user that may affect a traveling result may be fed back in real time in the game. For example, if the power applied to the vehicle increases, a displayed special effect stretches (as the velocity increases, a traveling track in the same period of time is longer), and a force angle (that is, the traveling direction) changes. In some embodiments, the first moving track is displayed in a target color when there is an obstacle in the first moving track, the target color being different from a color when there is no obstacle in the first moving track. In some embodiments, under normal driving conditions, the predicted route is displayed in green. For example, an arrow indicated by reference number 11 in FIG. 10 is a predicted route and is green. If a collision is to occur, the predicted route (e.g., the arrow indicated by reference number 11) changes to red to alarm, and a traveling route caused by a collision result is displayed according to the collision result.

Based on the foregoing embodiment of the disclosure, a traveling track and a final force condition of the vehicle during driving may be intuitively presented. By intuitively displaying a power model and a traveling trend of the vehicle, the user may easily understand factors that determine the traveling direction (e.g., power, steering, and inertial resistance), which makes it easy for the user to control the vehicle.

For ease of description, the foregoing method embodiments are stated as a combination of a series of actions. However, a person skilled in the art is to know that an example embodiment of the disclosure is not limited to the described action sequence, because according to an example embodiment of the disclosure, some operations may be performed in another sequence or simultaneously. In addition, a person skilled in the art is to also understand that the embodiments described in this specification are all example embodiments; and therefore, an action and a module involved are not necessarily mandatory in the embodiments of the disclosure.

According to the descriptions in the foregoing implementations, a person skilled in the art would clearly understand that the method according to the foregoing embodiment may be implemented by using software and a commodity hardware platform or by using hardware. Based on such understanding, the technical solutions of the embodiments of the disclosure or some contributing to the related art may be implemented in a form of a software product. The computer software product is stored in a storage medium, such as a read-only memory (ROM), a random access memory (RAM), a magnetic disk, or an optical disc) and includes several instructions for instructing a terminal device (which may be a mobile phone, a computer, a server, a network device, or the like) to perform the methods described in the embodiments of the disclosure.

An embodiment of the disclosure further provides an information display apparatus for performing the information display method. In some embodiments, the information display apparatus provided in an example embodiment of the disclosure includes:

an obtaining unit, configured to obtain a motion status of a target object at a current moment in a virtual scene and a first operation for controlling the target object to move in the virtual scene;

a determining unit, configured to predict a first moving track of the target object within a period of time after the current moment with reference to the motion status of the target object at the current moment and the first operation, the first moving track including a moving route of the target object within a period of time after the current moment; and a display unit, configured to display the first moving track and a second moving track, the second moving track being a moving track of the target object before the current moment, and a position at which the first moving track meets the second moving track being a position of the target object at the current moment.

Figure 11:
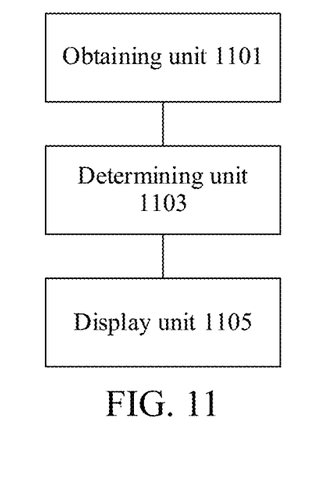
FIG. 11 is a schematic diagram of an information display apparatus according to an example embodiment of the disclosure.

An embodiment of the disclosure further provides an information display apparatus for performing the information display method. FIG. 11 is a schematic diagram of an information display apparatus according to an example embodiment of the disclosure. As shown in FIG. 11, the apparatus may include: an obtaining unit 1101, a determining unit 1103, and a display unit 1105.

The obtaining unit 1101 is configured to obtain a motion status of a target vehicle at a current moment in a virtual scene and a first operation for controlling the target vehicle to move in the virtual scene.

The client is a client provided after a target application is installed on the terminal. The virtual scene is a social or game virtual scene or the like provided by the target application (such as a social application or a game application).

The client provides an interface for a user to interact with a vehicle in the virtual scene, so that the user controls the vehicle. For example, control buttons are displayed on the client, and the user may control the vehicle by manipulating (e.g., tapping/clicking) these control buttons (such as buttons for controlling the first operation and a second operation).

The motion status may be at least one of a moving velocity, a moving direction, and an external force to the target vehicle. The first operation is a user operation, for example, an acceleration operation or a deceleration operation.

The determining unit 1103 is configured to combine the motion status and the first operation to predict a first moving track of the target vehicle within a period of time after the current moment, the first moving track including a moving route and a moving direction of the target vehicle within a period of time after the current moment.

The terminal determines the first moving track of the target vehicle after the current moment according to the motion status and the first operation. That is, the terminal estimates a moving track of the target vehicle in a future period of time (for example, 10 seconds) according to the motion status and the first operation. The moving track may include a moving route and a moving direction.

The display unit 1105 is configured to display the first moving track and a second moving track on a client, the second moving track being a moving track of the target vehicle before the current moment, and a position at which the first moving track meets the second moving track being a position of the target vehicle at the current moment.

The obtaining unit 1101 in an example embodiment may be configured to perform operation S202 in an example embodiment of the disclosure, the determining unit 1103 in an example embodiment may be configured to perform operation S204 in an example embodiment of the disclosure, and the display unit 1105 in an example embodiment may be configured to perform operation S206 in an example embodiment of the disclosure.

An example and an application scenario implemented by the foregoing modules may be the same as those implemented by corresponding operations, but are not limited to content described in the foregoing embodiments. The modules may be run in the hardware environment shown in FIG. 1 as a part of the apparatus, and may be implemented through software, or may be implemented through hardware or a combination of software and hardware.

Based on the information display apparatus provided in an example embodiment of the disclosure, a predicted traveling track (the first moving track) of the vehicle in a future period of time may be displayed at the same time as a track (the second moving track) that the vehicle has traveled, so that more relevant information is displayed in the virtual scene. In addition, the displayed moving tracks (the first moving track and the second moving track) helps a user to control the target vehicle more accurately and improves user experience.

In some embodiments, the display unit is further configured to display the first moving track in a first display manner and display the second moving track in a second display manner, the first display manner being different from the second display manner.

In some embodiments, the first moving track includes a first track segment and a second track segment, and the display unit is further configured to:

display the first track segment and the second track segment in the first display manner, the first track segment using the position of the target vehicle at the current moment as a start position, and the first track segment being a moving track generated when the target vehicle moves according to the motion status; and the second track segment using an end position of the first track segment as a start position, and the second track segment being a moving track generated when the target vehicle moves according to the motion status and collides with an obstacle.

In some embodiments, the display unit is further configured to display a third moving track and a fourth moving track on the client when a second operation is detected on the client, the third moving track being a moving track of the target vehicle after the second operation is detected, the fourth moving track being a moving track of the target vehicle before the second operation is detected, and the second operation being different from the first operation detected on the client at the current moment.

In some embodiments, the determining unit includes: a first determining module, configured to determine a first velocity of the target vehicle at a first moment by using a power model, the power model being configured to describe a relationship between an external force to the target vehicle at a second moment, a second velocity of the target vehicle at the second moment, traction of the target vehicle at the second moment, and the first velocity of the target vehicle at the first moment, and the second moment being a moment before the first moment;

a second determining module, configured to determine a track point of the target vehicle at the second moment according to the first velocity and the second velocity of the target vehicle; and a fitting module, configured to fit at least two track points within the period of time to obtain the first moving track.

In some embodiments, the first determining module is further configured to determine, when the external force includes friction of the target vehicle at the second moment, a first velocity corresponding to the friction of the target vehicle at the second moment, the second velocity, and the traction of the target vehicle at the second moment by using the power model.

In some embodiments, the first determining module is further configured to determine, when the external force includes a rebound force of the target vehicle in a collision at the second moment, a first velocity corresponding to the rebound force of the target vehicle at the second moment, the second velocity, and the traction of the target vehicle at the second moment by using the power model.

An example and an application scenario implemented by the foregoing modules are the same as those implemented by corresponding operations, but are not limited to content disclosed in the foregoing embodiments. The foregoing modules may be run in the hardware environment shown in FIG. 1 as a part of the apparatus, and may be implemented by using software or may be implemented by using hardware, where the hardware environment includes a network environment.

An embodiment of the disclosure further provides a server or a terminal configured to implement the foregoing information display method.

Figure 12:
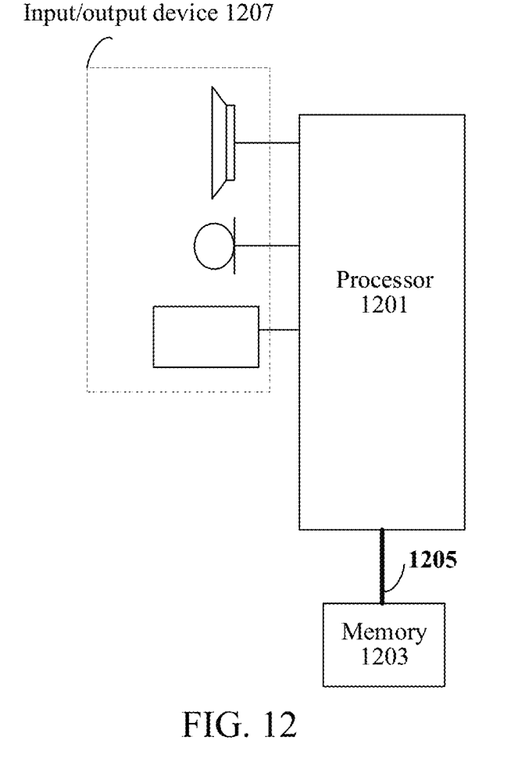
FIG. 12 is a structural block diagram of a terminal according to an example embodiment of the disclosure.

FIG. 12 is a structural block diagram of a terminal according to an embodiment of the disclosure. As shown in FIG. 12, the terminal may include one or more processors 1201 (only one processor is shown in FIG. 12 for brevity of description), a memory 1203, and a transmission apparatus 1205. As shown in FIG. 12, the terminal may further include an input/output device 1207.

The memory 1203 may be configured to store a software program and a module, for example, a program instruction/module corresponding to the information display method and apparatus in the embodiments of the disclosure, and the processor 1201 performs various functional applications and data processing by running the software program and the module stored in the memory 1203, that is, implementing the foregoing information display method. The memory 1203 may include a high-speed random memory, and may also include a nonvolatile memory, for example, one or more magnetic storage apparatuses, a flash memory, or another nonvolatile solid-state memory, and/or a volatile memory. In some embodiments, the memory 1203 may further include memories remotely disposed relative to the processor 1201, and the remote memories may be connected to a terminal through a network. Examples of the network include, but are not limited to, the Internet, an intranet, a local area network, a mobile communication network, and a combination thereof.

The transmission apparatus 1205 is configured to receive or send data by means of a network, or may further be configured to transmit data between the processor and the memory. The foregoing instances may include a wired network and a wireless network. In an example, the transmission device 1205 includes a network interface controller (NIC). The NIC may be connected to another network device and a router by using a network cable, so as to communicate with the Internet or a local area network. In an example, the transmission apparatus 1205 is a radio frequency (RF) module configured to communicate with the Internet in a wireless manner.

The memory 1203 is configured to store an application program.

The processor 1201 may run the application program stored in the memory 1203 to perform the information display method provided in the embodiments of the disclosure.

A person of ordinary skill in the art would understand that the structure shown in FIG. 12 is merely an example, and the terminal may be a terminal device such as a smartphone (for example, an Android mobile phone or an iOS mobile phone), a tablet computer, a palmtop computer, a mobile Internet device (MID), or a PAD. FIG. 12 does not limit the structure of the electronic apparatus. For example, the terminal may further include more or fewer components (for example, a network interface and a display apparatus) than those shown in FIG. 12, or have configuration different with that shown in FIG. 12.

A person of ordinary skill in the art would understand that all or some of the operations of the methods in the foregoing embodiments may be implemented by a program instructing relevant hardware of the terminal device. The program may be stored in a computer-readable storage medium. The storage medium may include a flash disk, a ROM, a RAM, a magnetic disk, an optical disc, and the like.

An embodiment of the disclosure further provides a computer storage medium storing a computer program for performing the information display method. The computer program is configured to perform the information display method provided in the embodiments of the disclosure.

In some embodiments, the storage medium may be located on at least one of a plurality of network devices in the network shown in the foregoing embodiment.

In some embodiments, the storage medium is configured to store a computer program configured to perform the following operations:

obtaining a motion status of a target vehicle at a current moment in a virtual scene and a first operation for controlling the target vehicle to move in the virtual scene;

predicting a first moving track of the target vehicle within a period of time after the current moment with reference to the motion status of the target vehicle at the current moment and the first operation, the first moving track including a moving route and a moving direction of the target vehicle within a period of time after the current moment; and displaying the first moving track and a second moving track, the second moving track being a moving track of the target vehicle before the current moment, and a position at which the first moving track meets the second moving track being a position of the target vehicle at the current moment.

The computer storage medium may include, but is not limited to, any medium that may store program code, such as a USB flash drive, a ROM, a RAM, a removable hard disk, a magnetic disk, or an optical disc.

The sequence numbers of the preceding embodiments of the disclosure are merely for description purpose but do not indicate the preference of the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of the disclosure, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of operations of the methods in the embodiments of the disclosure.

In the foregoing embodiments of the disclosure, the descriptions of the embodiments have respective focuses. For a part that is not described in detail in an embodiment, refer to related descriptions in other embodiments.

In the several embodiments provided in the disclosure, it is to be understood that, the disclosed client may be implemented in another manner. The apparatus embodiments described above are merely examples. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the technical solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

In the embodiments of the disclosure, a motion status of a target object (e.g., target vehicle) at a current moment in a virtual scene and a first operation for controlling the target object to move in the virtual scene are obtained; a first moving track of the target object within a period of time after the current moment is predicted based on the motion status of the target object at the current moment and the first operation, the first moving track including a moving route and a moving direction of the target object within a period of time after the current moment; and the first moving track and a second moving track are displayed, the second moving track being a moving track of the target object before the current moment. A position at which the first moving track may meet the second moving track being a position of the target object at the current moment. In this way, a predicted traveling track (the first moving track) of the object in a future period of time may be displayed at the same time as a track (the second moving track) that the object has traveled, so that more relevant information is displayed in the virtual scene. In addition, it helps a user to control the target object more accurately and improves user experience.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to example embodiments thereof, it will be understood that various changes in form and details may be made therein without departing from the spirit and scope of the following claims.

What is claimed is:

1. An information display method, performed by a terminal, the method comprising:
    obtaining a motion status of a target object at a current moment in a virtual scene and a first operation for controlling the target object to move in the virtual scene;
    predicting a first moving track along which the target object is to move within a period of time after the current moment based on the motion status of the target object at the current moment and the first operation; and
    displaying the first moving track and a second moving track, the second moving track being a moving track along which the target object has moved before the current moment.

2. The method according to claim 1, wherein the displaying the first moving track and the second moving track comprises:
    displaying the first moving track in a first display manner and displaying the second moving track in a second display manner,
    the first display manner being different from the second display manner.

3. The method according to claim 2, wherein the first moving track comprises a first track segment and a second track segment, and the displaying the first moving track in the first display manner comprises:
    displaying the first track segment and the second track segment in the first display manner,
    the first track segment using a position of the target object at the current moment as a start position, and the first track segment being a moving track generated based on the target object that moves according to the motion status; and
    the second track segment using an end position of the first track segment as a start position, and the second track segment being a moving track generated based on the target object that collides with an obstacle while moving according to the motion status.

4. The method according to claim 1, further comprising:
    displaying a third moving track and a fourth moving track based on detection of a second operation for controlling the target object to move in the virtual scene,
    the second operation being different from the first operation, the third moving track being a moving track along which the target object is to move after the detection of the second operation, and the fourth moving track being a moving track along which the target object moves before the detection of the second operation.

5. The method according to claim 1, wherein the predicting the first moving track comprises:
    determining a first velocity of the target object at a first moment by using a power model, the first moment being a moment after the current moment,
    the power model being configured to describe a relationship between an external force applied to the target object at a second moment, a second velocity of the target object at the second moment, traction of the target object at the second moment, and the first velocity of the target object at the first moment,
    the second moment being a moment before the first moment, and the motion status comprising: the external force to the target object at the second moment and the second velocity of the target object at the second moment, and
    the traction of the target object at the second moment being determined according to the first operation;

determining a track point of the target object at the second moment according to the first velocity and the second velocity of the target object; and fitting at least two track points within the period of time to obtain the first moving track.

6. The method according to claim 5, wherein the external force to the target object at the second moment comprises friction of the target object at the second moment, and the power model is further configured to describe a relationship between the friction, the second velocity, the traction of the target object at the second moment, and the first velocity; and the determining the first velocity comprises:
determining the first velocity according to the relationship between the friction, the second velocity, the traction of the target object at the second moment, and the first velocity.

7. The method according to claim 5, wherein the external force to the target object at the second moment comprises a rebound force of the target object in a collision at the second moment, and the power model is further configured to describe a relationship between the rebound force, the second velocity, the traction of the target object at the second moment, and the first velocity; and the determining the first velocity comprises:
determining the first velocity according to the relationship between the rebound force, the second velocity, the traction of the target object at the second moment, and the first velocity.

8. The method according to claim 1, wherein the displaying the first moving track comprises:
displaying the first moving track in a target color based on an obstacle being on the first moving track,
the target color being different from a color that is used based on no obstacle on the first moving track.

9. The method according to claim 1, wherein a position at which the first moving track meets the second moving track is a position of the target object at the current moment.

10. An information display apparatus, comprising:
at least one memory configured to store program code; and
at least one processor configured to read the program code and operate as instructed by the program code, the program code comprising:
obtaining code configured to cause the at least one processor to obtain a motion status of a target object at a current moment in a virtual scene and a first operation for controlling the target object to move in the virtual scene;
determining code configured to cause the at least one processor to predict a first moving track along which the target object is to move within a period of time after the current moment based on the motion status of the target object at the current moment and the first operation,
display code configured to cause the at least one processor to display the first moving track and a second moving track, the second moving track being a moving track along which the target object has moved before the current moment.

11. The apparatus according to claim 10, wherein the display code is further configured to cause the at least one processor to:
display the first moving track in a first display manner and display the second moving track in a second display manner,
the first display manner being different from the second display manner.

12. The apparatus according to claim 11, wherein the first moving track comprises a first track segment and a second track segment, and the display code is further configured to cause the at least one processor to:
display the first track segment and the second track segment in the first display manner,
the first track segment using a position of the target object at the current moment as a start position, and the first track segment being a moving track generated based on the target object that moves according to the motion status; and
the second track segment using an end position of the first track segment as a start position, and the second track segment being a moving track generated based on the target object that collides with an obstacle while moving according to the motion status.

13. The apparatus according to claim 10, wherein
the display code is further configured to cause the at least one processor to display a third moving track and a fourth moving track based on detection of a second operation for controlling the target object to move in the virtual scene,
the second operation being different from the first operation, the third moving track being a moving track along which the target object moves after the detection of the second operation, and the fourth moving track being a moving track along which the target object moves before the detection of the second operation.

14. The apparatus according to claim 10, wherein the determining code comprises:
first determining code configured to cause the at least one processor to determine a first velocity of the target object at a first moment by using a power model, the first moment being a moment after the current moment,
the power model being configured to describe a relationship between an external force to the target object at a second moment, a second velocity of the target object at the second moment, traction of the target object at the second moment, and the first velocity of the target object at the first moment,
the second moment being a moment before the first moment, and the motion status comprising: the external force to the target object at the second moment and the second velocity of the target object at the second moment, and
the traction of the target object at the second moment being determined according to the first operation;
second determining code configured to cause the at least one processor to determine a track point of the target object at the second moment according to the first velocity and the second velocity of the target object; and
fitting code configured to cause the at least one processor to fit at least two track points within the period of time to obtain the first moving track.

15. The apparatus according to claim 14, wherein the external force to the target object at the second moment comprises friction of the target object at the second moment, and the power model is further configured to describe a relationship between the friction, the second velocity, the traction of the target object at the second moment, and the first velocity; and the first determining code is further configured to cause the at least one processor to:

determine the first velocity according to the relationship between the friction, the second velocity, the traction of the target object at the second moment, and the first velocity.

16. The apparatus according to claim 14, wherein the external force to the target object at the second moment comprises a rebound force of the target object in a collision at the second moment, and the power model is further configured to describe a relationship between the rebound force, the second velocity, the traction of the target object at the second moment, and the first velocity; and the first determining code is further configured to cause the at least one processor to:

determine the first velocity according to the relationship between the rebound force, the second velocity, the traction of the target object at the second moment, and the first velocity.

17. The apparatus according to claim 10, wherein the display code is further configured to cause the at least one processor to:

display the first moving track in a target color based on an obstacle being on the first moving track, the target color being different from a color that is used based on no obstacle being on the first moving track.

18. The apparatus according to claim 10, wherein a position at which the first moving track meets the second moving track is a position of the target object at the current moment.

19. A non-transitory computer storage medium, storing a computer program, the computer program being executable by at least one processor to perform:

obtaining a motion status of a target object at a current moment in a virtual scene and a first operation for controlling the target object to move in the virtual scene;

predicting a first moving track along which the target object is to move within a period of time after the current moment based on the motion status of the target object at the current moment and the first operation; and displaying the first moving track and a second moving track, the second moving track being a moving track along which the target object has moved before the current moment.

* * * * *